Aug. 24, 1926.
J. F. KEY
1,597,076
INDICATING OR MEASURING DEVICE AND SYSTEM
Filed July 2, 1924 3 Sheets-Sheet 1
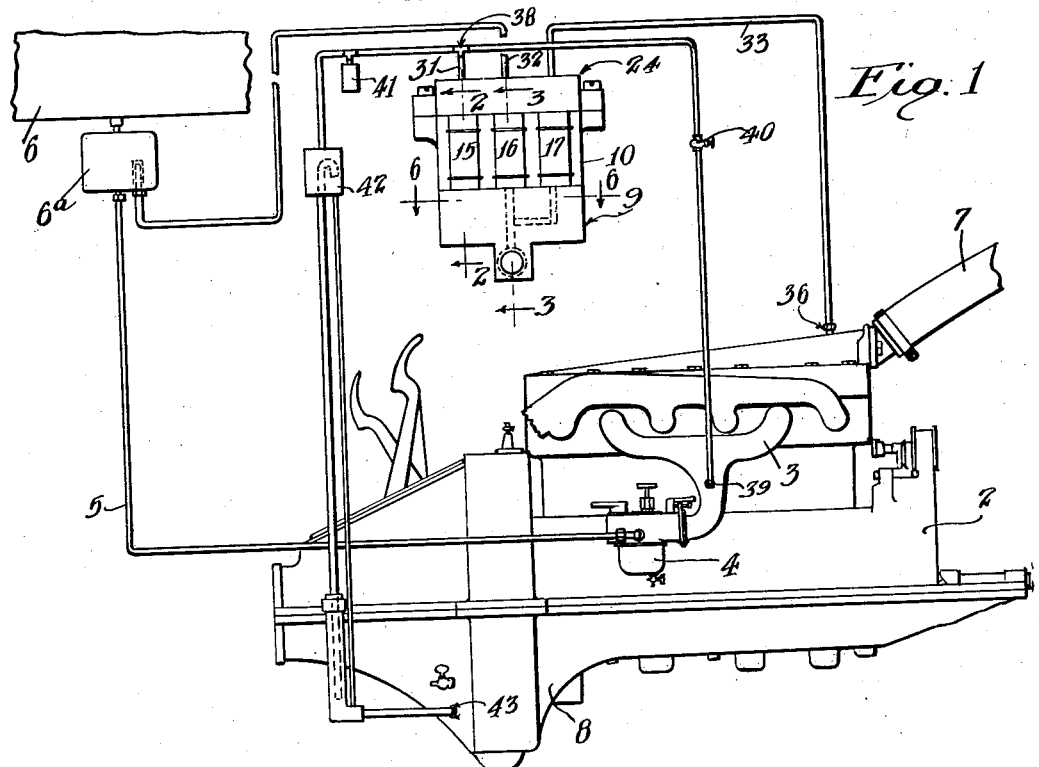
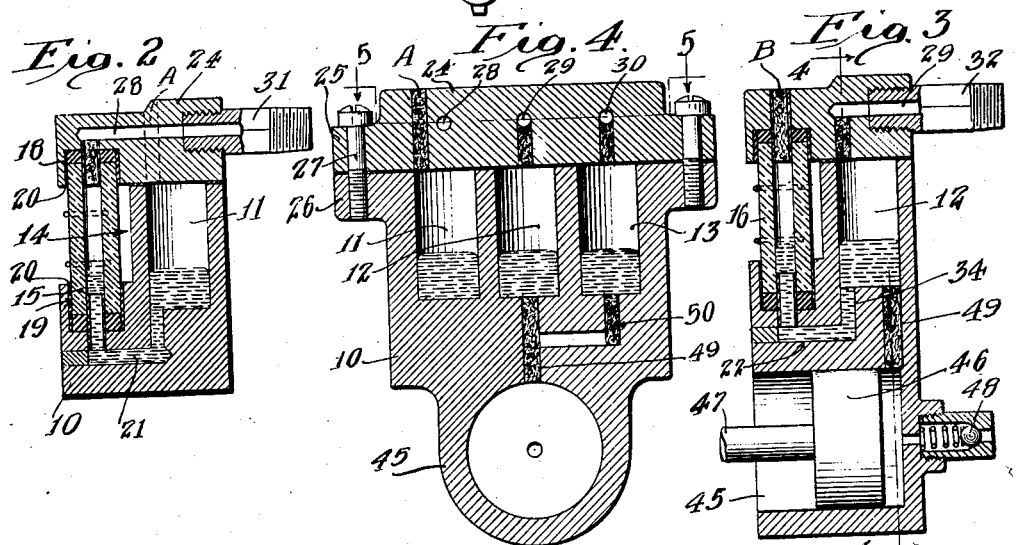
Inventor
James F. Key
By Lyon & Lyon
Attorneys Aug. 24, 1926. 1,597,076
J. F. KEY
INDICATING OR MEASURING DEVICE AND SYSTEM
Filed July 2, 1924 3 Sheets-Sheet 2
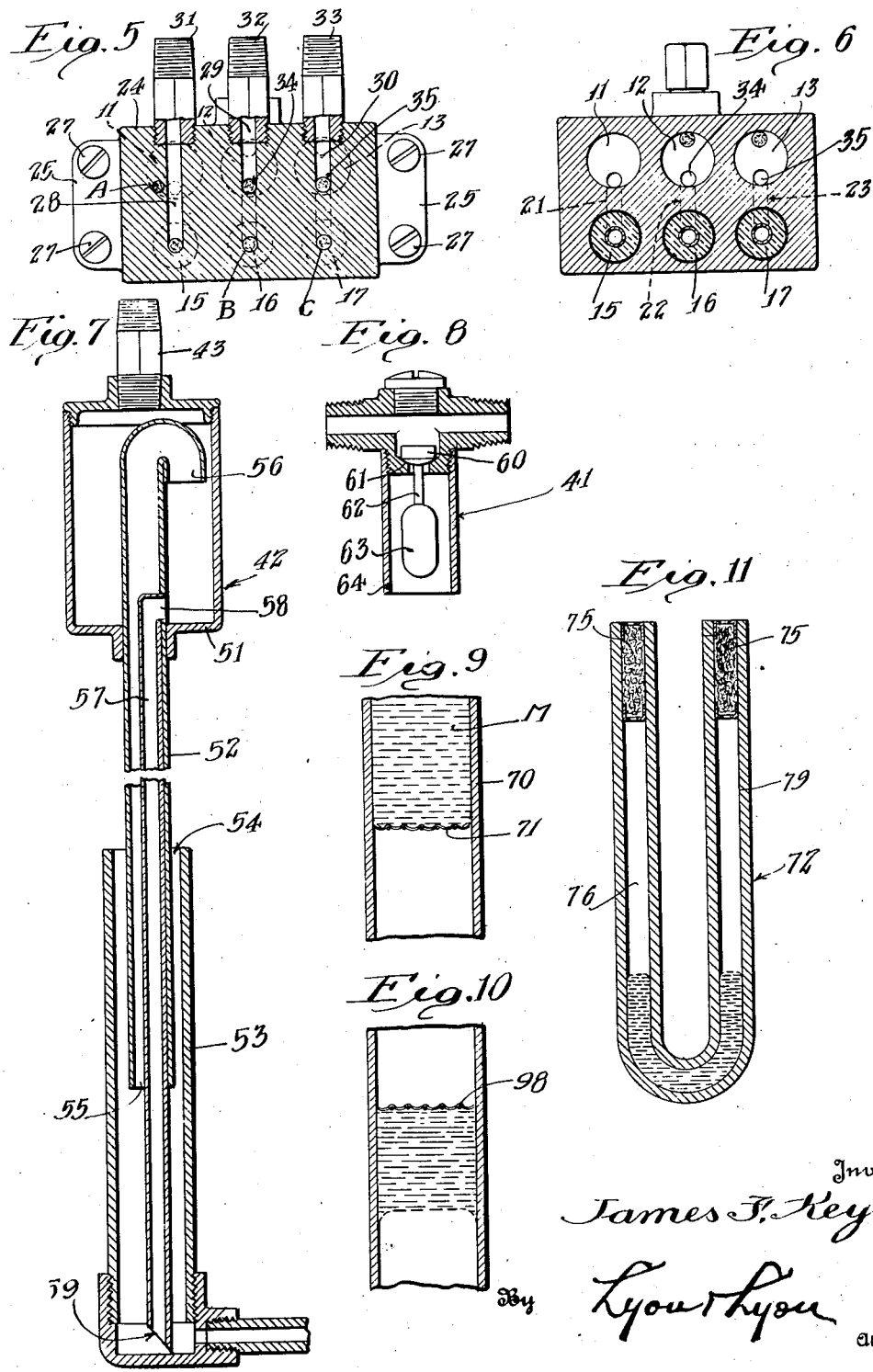
Inventor
James F. Key
By Lyon & Lyon
Attorneys Aug. 24, 1926.  
J. F. KEY  
1,597,076  
INDICATING OR MEASURING DEVICE AND SYSTEM  
Filed July 2, 1924 3 Sheets-Sheet 3
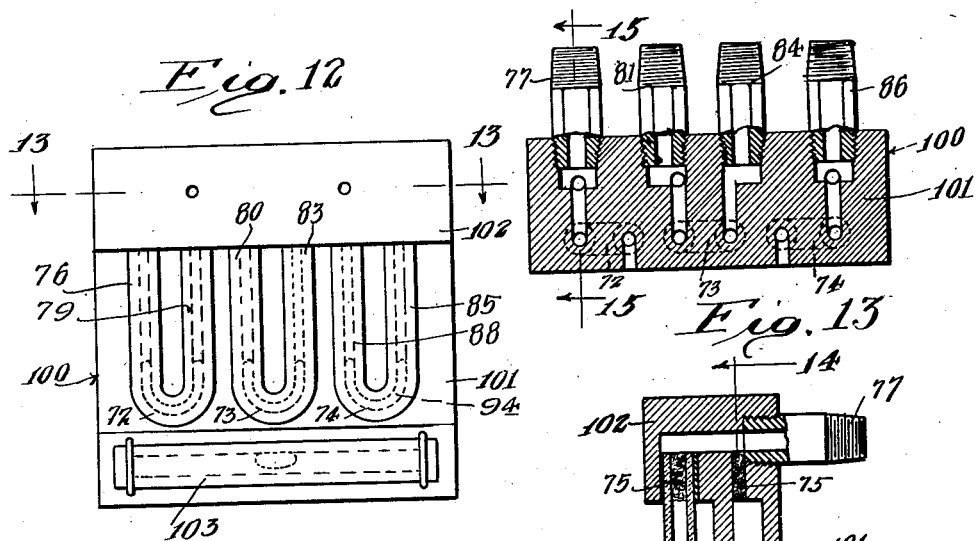
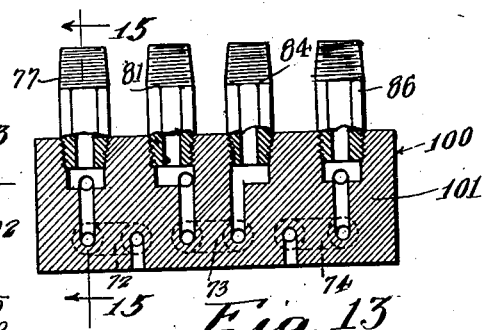
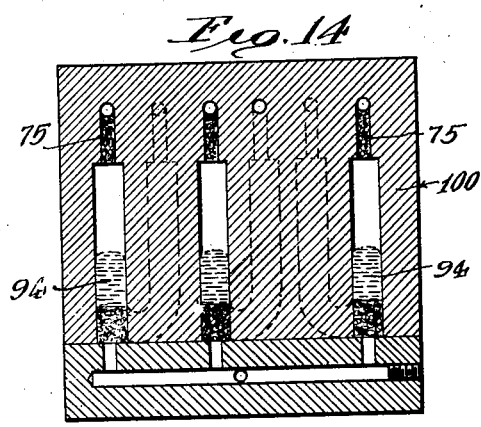
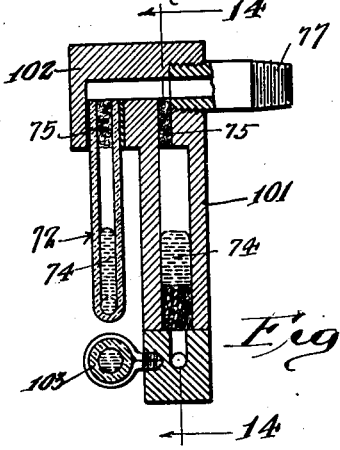
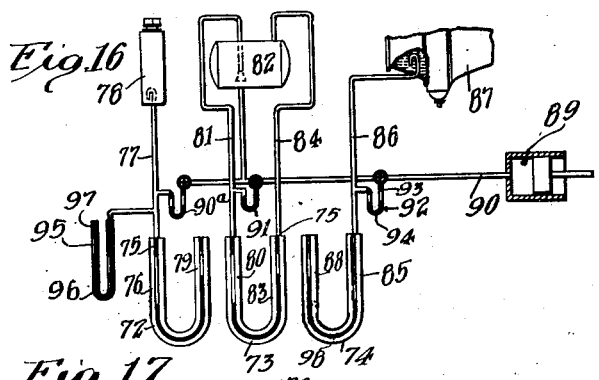
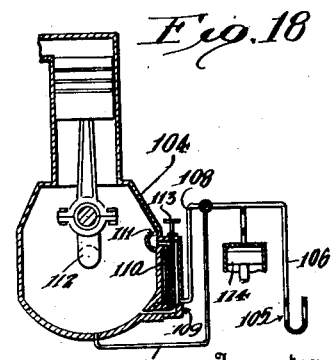
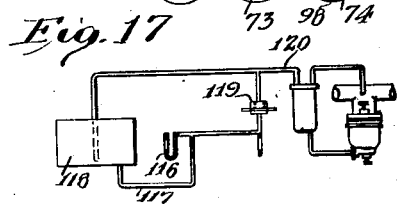
Inventor  
James F. Key  
By Lyon & Lyon  
Attorneys Patented Aug. 24, 1926.

1,597,076

UNITED STATES PATENT OFFICE.

JAMES FRANCIS KEY, OF SIERRA MADRE, CALIFORNIA, ASSIGNOR TO FIRST TRUST & SAVINGS BANK OF PASADENA, A CORPORATION OF CALIFORNIA, TRUSTEE.

INDICATING OR MEASURING DEVICE AND SYSTEM.

Application filed July 2, 1924. Serial No. 723,851.

This invention relates generally to indicating or measuring devices and systems and is particularly directed to a device and system for indicating the condition of various supplies, such as gasoline, oil or water supplies for an internal combustion engine.

An object of the present invention is to provide a system by which the condition of a plurality of supplies for an internal combustion engine may be indicated by a common compact indicator; and a more specific object of the present invention is to provide a system for indicating the condition of several supplies for an internal combustion system, which system may be actuated by pressure conditions created in a line between an indicator and the various supply systems and to provide indicating elements having means responsive to such pressure conditions operative to give a continual indication of the character or condition of the several supplies without requiring continual control of the pressure conditions actuating the indicating elements and to provide further such indicating units for the system which may include liquid indicating columns positively sealed in the system.

Various additional objects and advantages of the invention will be apparent from the description of a preferred example or examples of devices and systems embodying the present invention, for which purpose reference is made to the accompanying drawings, in which I have illustrated preferred forms or embodiments of this invention.

In the drawings:

Figure 1 is a somewhat diagrammatical view of an indicating system embodying the invention, the figure illustrating an internal combustion engine in side elevation and disclosing a preferred manner of connecting my indicating system therewith.

Fig. 2 is a vertical partial section taken through the indicator on the line 2—2 of Figure 1.

Fig. 3 is a similar section on the line 3—3 of Figure 1.

Fig. 4 is a vertical section on the line 4—4 of Fig. 3.

Fig. 5 is a horizontal section on the line 5—5 of Fig. 4.

Fig. 6 is a horizontal section on the line 6—6 of Fig. 1.

Fig. 7 is an elevation in vertical section of the separator employed in connection with the oiling system; and Fig. 8 is an elevation mainly in vertical section of a safety valve employed with the system.

Figs. 9 and 10 are fragmentary sections of certain capillary seals employed in the various systems.

Fig. 11 is an elevation in longitudinal section of a modified form of indicator unit.

Fig. 12 is a front elevation of an indicator provided with a plurality of indicator units shown in Fig. 11.

Fig. 13 is a horizontal section on the line 13—13 of Fig. 12.

Fig. 14 is a vertical section on the line 14—14 of Fig. 15.

Fig. 15 is a vertical section on the line 15—15 of Fig. 13.

Fig. 16 is a modified form of indicator system preferably employing the indicator of Figs. 11 to 15, inclusive.

Fig. 17 is a further modification of certain parts of the system; and

Fig. 18 is a further modification of the system.

Refering to Figures 1 to 8, inclusive, of the drawings, the form of invention there disclosed is shown connected with an internal combustion engine 2, having a customary manifold 3 distributing fuel to the engine from a carbureter 4, supplied with fuel through a line 5 connected with a fuel supply tank 6 preferably through an auxiliary tank 6ª designed to hold a small quantity of fuel. 7 indicates a conduit which in operation conducts water or other cooling fluid from a radiator (not shown) to certain water jackets for the engine. The internal combustion engine 2 is also indicated as being provided with a crank case 8 for holding a supply of lubricant for the engine.

9 represents an indicator of the system which is operative to continually indicate conditions of the various liquid supplies to the internal combustion engine 2 indicating the condition of such supplies as the fuel or gasoline in the tank 6, oil or lubricant within the crank case 8 and water or other cooling fluid in the radiator of the cooling system of the engine.

The indicator 9 preferably comprises a lower body member 10 having a plurality of liquid receiving chambers 11, 12 and 13, which in the particular indicator of this embodiment of the invention are upright and cylindrical in shape and open at the upper end of the body member 10. The forward and upper part of the body member 10 of the indicator 9 is provided with a horizontal recess 14, adapted to receive indicating tubes 15, 16 and 17, which are vertically disposed in the recess 14 having their lower ends fitted into recesses 19 in the body 10 and there engaging packing 20 to tightly seal the indicating tubes to the indicator body. The tubes 15, 16 and 17 are formed of transparent material preferably glass, and the bore of such tubes 15, 16 and 17 communicate through passages 21, 22 and 23 with the bottom of the chambers 11, 12 and 13 respectively. Thus there is provided in the indicator, a plurality of separate indicating units each having two inter-connected liquid containing members so that in each unit, such as the unit including the chamber 11 and the tube 15, liquid forced or passing downward in one of the chambers will rise up in the other chamber. 24 indicates an upper body member of the indicator, the upper member 24 and lower member 10 having corresponding flanges 25 and 26 through which bolts 27 are passed to firmly retain the member 24 on the member 10.

The member 24 is provided with recesses 18 into which are packed the upper ends of the indicating tubes 15, 16 and 17. The member 24 is provided with horizontal ducts 28, 29 and 30 connected with lines 31, 32 and 33, respectively. The duct 31 communicates with the bore or chamber of the indicator tube 15 at its upper end, whereas the ducts 29 and 30 respectively, communicate through vertical ducts 34 and 35 with the top of the chambers 12, 13, respectively. The member 24 provides a vent A, communicating with top of chamber 11 and vents B and C communicating with tops of tubes 16 and 17, respectively.

The line 33 connected with the top member 24 of the indicator, connects with the cooling system 7 of the internal combustion engine as indicated at 36. The line 32 connecting with the top member 24 leads from an auxiliary gasoline tank 6ª and the line 31 connects through a three-way connection 38 with the manifold 3 of the engine as indicated at 39, a valve 40 being placed between the manifold 3 and member 24 of the indicator. The line 31 is also in communication through a safety valve 41 and separator 42 with the oil in the crank case 8 of engine 2 as indicated at 43.

In this form of the invention thus, the indicating tube 15 is operative as later described to indicate the condition of the oil and lubricating system of the engine. The indicating tube 16 operates to indicate the condition of the fuel supply in the tank 6 and 6ª whereas the indicating tube 17 indicates the condition of the cooling system 7 of the engine.

Means are associated with the system to apply or remove air or similar gas to the lines 32 and 33 for operating the indicator 9. Such means may be any preferred or customary form of air pump or air reservoir connected through a valve or the like with such lines. In the preferred form of the invention, the body member 10 of the indicator includes a pump for such purpose, the lower end of the member 10 providing a horizontal cylinder 45 in which a piston 46 is mounted to reciprocate the piston 46 being connected to a rod 47 which when the system is installed upon an automobile or similar vehicle extends beyond the dash board of the automobile so that piston 46 may be reciprocated therefrom. The piston 46 draws air or other gas into the chamber 45 through a check valve 48 and is operative to force such air or gas through ducts 49 and 50, respectively, into the lower end of the chambers 12 and 13. Such gas will pass up through the liquid contained in such chambers and out through the lines 32 and 33, respectively, the air passing through the line 32 entering the bottom of the gasoline auxiliary tank 6ª and escaping therefrom. The head of the fuel in the tanks 6 and 6ª will impart an air pressure to the line 32, which will reflect to force such liquid as is within the chamber 12 down in the chamber and up in the fuel condition indicator tube 16, whereas the gas or air in the line 33 will be introduced into the cooling system of the engine 2 at the point 36, and the head of the cooling fluid in the radiator or other means connected with the line 7 will impart a proportional air pressure to the line 33, causing the liquid in the chamber 13 to be thrust downwardly and rise upwardly in the cooling system indicating tube 17 indicating conditions of the cooling system. The oil indicator tube 15 is actuated by vacuum applied from the manifold 3 of the engine. The action of the vacuum developed in the manifold 3 requires a description of the separator 42.

Such separator 42 includes a trap 51 connecting at its upper end 43 with the line 31 and connecting at its lower end to a line 52, which extends down into a stand pipe 53 in communication with the crank case 8 of the engine, and opened at its upper end as indicated at 54. The stand pipe 53 thus normally contains a lubricant therein at a height on a level with the height of lubricant in the crank case 8. The line 52 extends part way down within the stand pipe 53 and communicates therewith as indicated at 55. The upper end of the line 55 extends within the trap 51 close to the top thereof, and is there provided with a return bend communicating the interior of the trap 51 as indicated at 56. 57 indicates a return line from the trap which may be telescoped within the line 52 and preferably communicates with the trap 51 near the lower end thereof as indicated at 58, the line 57 extending down below the end of the line 52 and near the bottom of the stand pipe 53, and communicates with the pipe at its lower end as indicated at 59.

It now can be seen that reduced pressure applied from the manifold 3 will create a reduced pressure within the trap 51. The reduced pressure in the trap 51 will act upon the lines 52 and 57 when oil is above the point 55 in the separator to create a reflected reduced pressure in proportion to the head of oil between the point 55 and 59. This reduced pressure operates through the line 31 upon the top of the oil condition indicating tube 15 to draw the mercury up in the indicating tube 15 coming from the chamber 11. The safety valve 41 operates to prevent application of excess reduced pressure upon the line 31, such safety valve comprising a valve member 60 normally resting by gravity upon a seat 61, the valve head 60 being connected by a rod 62 to a weight 63, the weight 63 being surrounded by a casing 64. If pressure in the line 31 is sufficiently reduced to overcome the effect of the weight 63 upon the valve head 60, such valve will raise from its seat 61 and admit air to the line 31 and thus raise the pressure therein. This valve thus provides a safety device which operates to positively prevent an excessive reduction in pressure in the line 31.

Seals are provided associated with the various indicating units on the indicator 9 to perform several important functions upon which to a large degree the success of the indicating system is predicated. Without such seal, or equivalent means as will be later described, the indicating tubes 16 and 17 could indicate only the condition of the fuel and water systems when air was supplied to the lines 32 and 33, continually. Moreover, it is necessary to associate with the indicator certain means to positively prevent displacement of the liquid contained therein, so that jarring of the system will not cause the indicating fluid to escape from the indicator. For this purpose, I have provided a novel form of hermetical seal or surface tension auxiliary valve for the indicator, the construction and arrangements of the valve or seal being generally dependent upon the nature of the fluid which is to be sealed within the indicator.

In the form of the invention shown in Figures 1 to 8, inclusive, the indicator 9 has mercury for an indicating fluid and the indicator is provided with hermetical seals or surface tension valves which are positioned within the various lines leading to the chambers of the indicator, the seals or valves being operative by adhesion to enable the surface tension of the liquid mercury to prevent the liquid mercury passing such means. This may be accomplished by providing a sieve or mesh of various materials within such lines or ducts which will not be wet by the mercury, and hence operate to hold back and prevent the mercury passing such sieve or mesh.

Various fibrous materials will be found suitable for this purpose such as cotton properly packed and held within such duct. The action of such a surface tension seal may be understood from a discussion of Fig. 9.

In Fig. 9 "M" indicates a quantity of mercury within a tube 70, the mercury tube 70 being sealed from descending the tube by hermetical or surface tension seal 71 and below such seal, the surface tension of the liquid mercury causing the lower surface of the liquid to act in a manner analagous to a thin sheet of rubber stretched over the bottom of the liquid. The sieve or screen 71, if sufficiently fine, reduces the size of passages for the liquid mercury therethrough to a point where the surface tension of the mercury operates to prevent any passage of mercury past the screen 71, the effect of the screen 71 upon the mercury being the same as the effect of a screen or mesh upon a rubber sheet in supporting the rubber sheet against bursting when a liquid pressure is applied thereto.

Thus in the indicator 9 capillary seals or valves are shown in vents A, B and C, in lines or ducts 49 and 50 leading from pump cylinder 45, and in ducts 28, 29 and 30 leading to lines 31, 32 and 33, respectively, sealing the passage of the liquid mercury in the indicator from passing and of such seals, although providing a seal or valve perpetually open for the passage of other fluid such as gas. The indicator 9 thus can be sealed in a factory shipped in any position, installed without adjustment and excessive pressure or tipping of the indicator 9 will cause the indicating liquid to be discharged from the indicator.

Now referring again to the indicating system, first, in connection with the cooling system indicator 33 air supplied through the duct 50 within the chamber 13 is prevented escaping back to the pump by the action of the surface tension valve provided by the cotton or similar material placed in the chamber 50, and sealing the passage 50 against mercury flowing or descending such passage. Such gas or air thus must continually operate to retain the mercury elevated in the indicating tube 17 to reflect conditions of the cooling system 7. The vents B and C from the upper ends of the indicating tubes 16 and 17 and the passages 29 and 30 are provided with such surface tension or capillary seals and the mercury is positively sealed within the indicator 9, although free passage of air to or from such lines is permitted.

Now referring to the embodiment of the invention shown in Figures 11 to 16, inclusive, the system diagrammatically shown in Figure 16 includes a plurality of indicating units 72, 73 and 74, the indicating units being shown in U-form and are preferably made of glass or other transparent material, the tubes 72 and 73 holding a quantity of mercury, whereas the tube 74 contains a quantity of liquid of considerably lower specific gravity such as oil. At the top of each leg of each indicator tube 72 and 73 a capillary seal 75 is placed and from one leg 76 of the tube 72 a line 77 is in communication with the lower end of a radiator 78 or other part of the cooling system of an internal combustion engine, the line 77 communicating with or near the lower end of such reservoir 78. The other leg 79 of the indicator 72 is vented to the atmosphere through the capillary seal. The indicator tube 73 has one leg 80 connected through its capillary seal with a line 81, which communicates with a fuel supply tank 82 near its lower end and the other end 83 of the indicator tube 73 connects through line 84 with the upper end of the fuel tank 82. The indicator tube 74 has one leg 85 connected through line 86 with a crank case 87 of an engine near its lower end and the other leg 88 is vented to the atmosphere. The system diagrammatically shown in Figure 16 is that preferred for use upon an internal combustion engine of the force feed type. The customary pump 89 of such a force feed system is shown connected through a line 90 through mercury check or seal valves 90$^a$, 91, and 92 with the lines 77, 81 and 86, respectively, the mercury check valves each including spaced apart capillary seals 93 between which a quantity of mercury 94 is placed, the quantity of mercury being less than that sufficient to fill the space between the seals 93. The line 90 also connects with a capillary seal safety valve 95 shown as made in U-form with mercury indicated at 96 in the lower end and capillary seals 97 at the upper end of the leg of the valve.

To seal the oil or similar liquid which is employed in the indicator tube 74 the form of seal shown in Figure 10 is employed in that material such as cotton is placed at or near the bottom of the tube as indicated at 98. The action of this seal is somewhat the reverse of the seal employed with mercury as the indicating liquid, in that the seal operates by cohesion in place of adhesion. The oil or similar liquid in indicator unit 74 wets the cotton and thus passes through the same, as the end of the liquid comes to the first end of the seal of cotton the cohesive force of the liquid holds the cotton forming a seal operative to prevent gas passing the wet cotton seal with the result that the passage of liquid is stopped. Thus the tube 74 may be handled as safely as tubes 72 and 73 and the seal 98 prevents the discharge of liquid therefrom.

In operation with this form of system, the normal operation of force feed pump 89 supplies compressed air through the line 90 and through check valves 90$^a$, 91 and 92 to the lines 77, 81 and 86, the check valves 90$^a$, 91 and 92 preventing the release of this pressure back through the pump 89. The air forced into such line 77, 81 and 86 pass into the radiator 78, fuel tank 82 and crank case 87, respectively, reflecting air pressure upon the indicating tube 72, 73 and 74, which normally corresponds with the head of liquid supplies in such radiator 78, fuel tank 82 and crank case 87, respectively. If the pressure exerted through the line 90 becomes, for any reason, too great for the system, such pressure will force the mercury in the safety valve 95 up into the bent leg of such valve where the air may bubble past such mercury and escape to the atmosphere. By properly proportioning the quantity of mercury within the check valve 95 such valve may be made to release pressure from the line 90 at any desired maximum pressure.

It would seem that in connection with the fuel supply tank 82, irrespective of the amount of pressure applied above the liquid fuel therein, the indicating tube 73 will reflect the head of liquid therein, as the leg 83 of such tube is connected with the upper end of said tank 82. In addition to normally indicating the heads of the different supplies in the systems connected therewith, various other conditions of the different supply systems are indicated by the indicating system. Thus, for example, the indicator tube 72, in addition to indicating the height of cooling fluid in the cooling system, indicates whether such cooling fluid has reached the boiling point as the boiling of the cooling fluid will create an additional pressure reflected upon the tube 72 and will also be indicated by fluxation in the reading of the tube 72.

The indicating tubes 72, 73 and 74 are preferably mounted in the unit casing or body 100, which also mounts the check valves 90$^a$, 91 and 92. The body 100 has a vertical extending rear section 101 joined at its upper end with an overhanging section 102. The indicator tubes 72, 73 and 74 are sealed in openings in such overhanging section 101 and suspended therefrom, whereas the check valves 90$^a$, 91 and 92 are formed in the vertical part 101 of the body. A level indicator 103 is indicated as attached to the body below the tubes 72, 73 and 74.

Now referring to Figure 18, a preferred connection with a crank case 104 of an internal combustion engine is shown, which may be employed with any of the systems before described. 105 represents an indicator tube connected by a line 106 through a line 107 with the lower end of the crank case 104 and also through a branch line 108 with trouble locator 109 for the reflecting system, the trouble locator comprising a chamber 110, the upper end of which is connected with a catch basin 111 provided by a flange within the crank case 104, which flange is in position to receive lubricant supply splashed from the crank arm 112 of the engine, the lower end of the chamber 110 connecting with the crank case below such catch basin 111. The chamber 110 is provided with an adjustable needle valve 113 controlling the flow from the basin 111 to the bottom of the crank case.

In operation the needle valve 113 is adjusted so that in normal operation the chamber 110 will continue to hold a quantity of lubricant supplied by splash from the crank case 112 or other means. If, for any reason, lubricant to the bearings or other parts of such cylinder fails, passage of oil out of the chamber 110 will take place and air supplied to the line 106 by any means such as through the pump 114 will freely escape through the chamber and basin 111 without creating a reflected pressure in the indicating tube 105.

In Figure 17, I have indicated certain modifications which may be made in the system when used upon the vacuum feed type of internal combustion engine. In Figure 17, 116 represents an indicating unit connected by line 117 with the bottom of the fuel tank 118, the line 117 also connecting with a diaphragm pump 119 with a vacuum line 120 of the system.

Various conditions of the several supplies may be indicated by my system thus; the height of fuel supply with special indication for the last unit of fuel supply when using an auxiliary tank such as the tank 6*; the height of cooling fluid and boiling of the cooling fluid; subnormal lubrication of any bearing or subnormal quantity of oil thrown from the bearing due to low oil, defective pump, plugging, disconnected or broken feed pipe.

While the invention has been described in its preferred form or forms, various modifications can be made within the spirit of the invention and the invention is of the scope set forth in the accompanying claims.

I claim:

1. A system for indicating the conditions of supplies for an internal combustion engine, comprising a plurality of gas pressure responsive liquid containing indicator units, means connecting the units to supply systems of the engine, a common means for creating pressure conditions in the connections operative to cause the units to respond to the quantities of liquid in the supply systems, capillary seals operative to maintain the indicator units continually responsive to the conditions of the supply systems, the indicator units being vented, and capillary seals operative to prevent escape of liquid from the indicator units.

2. A gas pressure responsive indicator including two connected chambers containing a liquid, a connection between one of such chambers and a supply system, a vent for the other chamber, means operative to create a pressure in the connection according to the quantities of liquid in the supply system, and capillary seals operative to prevent flow of the liquid from the indicator through said vent or connection.

3. In a device of the class described, a visible liquid column, means for connection of the liquid column with a supply reservoir of an internal combustion engine means for creating a pressure condition in the connection operative to cause the liquid column to vary in height in accordance with the height of liquid in the supply reservoir and a capillary check valve cooperating with said connection to maintain the visible column of liquid in a condition to continually indicate the height of liquid in said supply reservoir.

4. A system for indicating the conditions of an internal combustion engine and supplies therefor, comprising a plurality of gas responsive indicator units, gas holding conduits connecting the units to different liquid supply systems, a common means for creating gas pressure conditions in the conduits proportional to the height of the liquids in the different liquid supply systems operative to cause the units to respond in accordance with the height of liquid in the supply systems, and capillary seals operated to maintain the indicator units continually responsive to the conditions of the supply system.

Signed at Los Angeles, California, this 25th day of June, 1924.

JAMES FRANCIS KEY.